United States Patent [19]
Harrison

[11] Patent Number: 5,544,273
[45] Date of Patent: Aug. 6, 1996

[54] FIBER OPTIC CABLE STORAGE SHELF AND METHOD USING SAME

[75] Inventor: C. Gordon Harrison, Plano, Tex.

[73] Assignee: DSC Communications Corporation, Plano, Tex.

[21] Appl. No.: 375,802

[22] Filed: Jan. 19, 1995

[51] Int. Cl.⁶ ........................................... G02B 6/00
[52] U.S. Cl. ............................ 385/135; 385/134
[58] Field of Search ............................. 385/134, 135, 385/136, 137

[56] References Cited

U.S. PATENT DOCUMENTS

| | | | |
|---|---|---|---|
| 4,765,710 | 8/1988 | Burmeister et al. | 385/134 X |
| 4,846,343 | 7/1989 | Rupert | 385/135 X |
| 5,071,211 | 12/1991 | Debortoli et al. | 385/135 X |
| 5,109,983 | 5/1992 | Malone et al. | 206/408 |
| 5,129,030 | 7/1992 | Petrunia | 385/135 |
| 5,131,066 | 7/1992 | Foss | 385/135 |
| 5,167,001 | 11/1992 | Debortoli et al. | 385/135 |
| 5,189,724 | 2/1993 | Hartley | 385/135 |
| 5,265,187 | 11/1993 | Morin et al. | 385/135 |
| 5,323,479 | 6/1994 | Allen | 385/135 |
| 5,353,367 | 10/1994 | Czosnowski et al. | 385/135 |
| 5,412,497 | 5/1995 | Kaetsu et al. | 359/163 |

*Primary Examiner*—Brian Healy
*Attorney, Agent, or Firm*—Baker & Botts, L.L.P.

[57] ABSTRACT

A storage shelf (10) is provided for accommodating excess lengths of a plurality of optical cables (40) connected to and extending from electronic equipment. The storage shelf (10) includes a shelf housing (12) with an open front and two substantially vertical side walls (24, 26). The excess length of each optical cable (40) is coiled about the spool (42) formed in a cable storage cartridge (16). The storage cartridge (16) can be slidably inserted in the shelf housing (12) and stacked vertically therein. Each cable storage cartridge (12) has two opposable members (50, 52) closeable about a self hinge (56). The cable storage cartridge (16) further has two cable exit ports (44, 46) for allowing the two ends of the optical cable (40) to extend therethrough out of the cartridge (16) for connection with the telecommunications equipment.

22 Claims, 4 Drawing Sheets

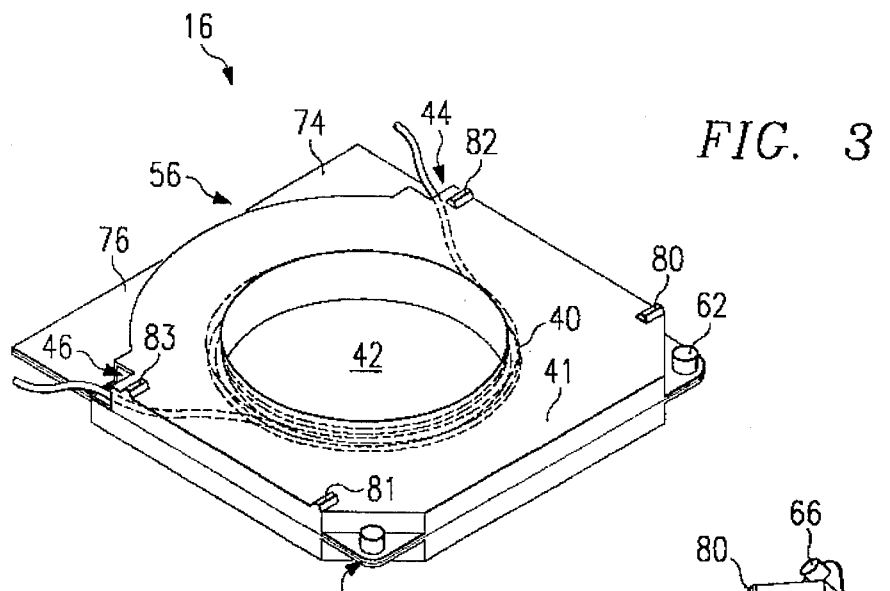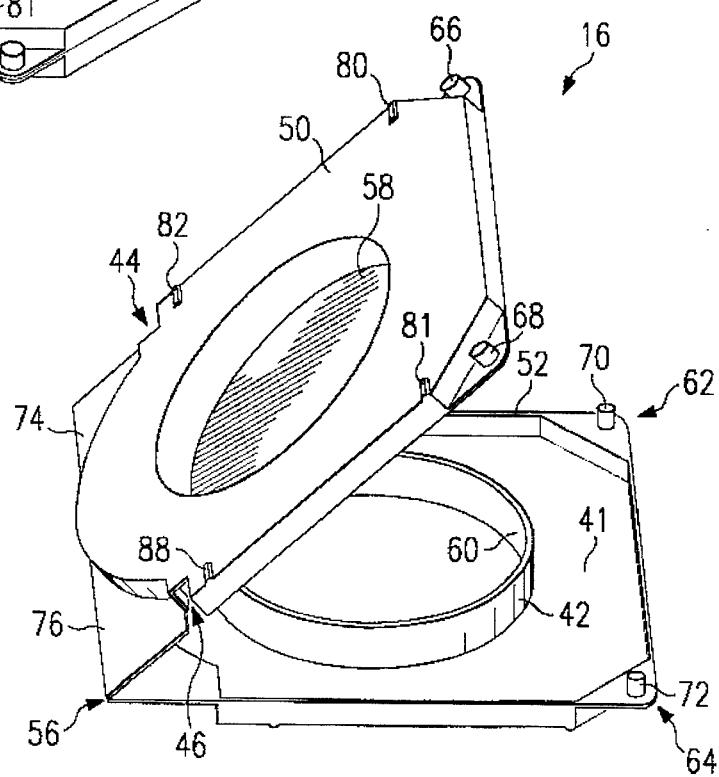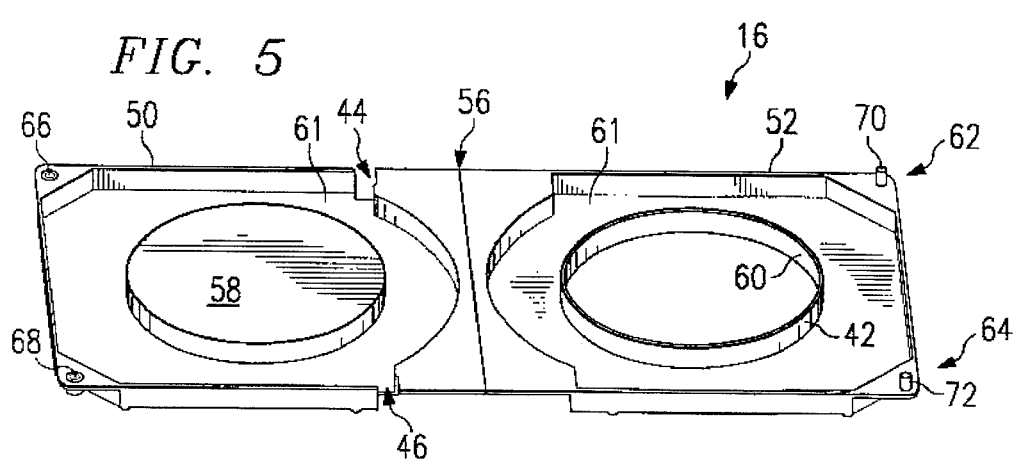

FIBER OPTIC CABLE STORAGE SHELF AND METHOD USING SAME

TECHNICAL FIELD OF THE INVENTION

This invention relates in general to the field of storage apparatus for coiled cables. More particularly, the present invention relates to a fiber optic cable storage cartridges and a storage shelf.

BACKGROUND OF THE INVENTION

The telecommunications and data transmission industries are increasingly dependent on optical fibers to relay data being transmitted to our homes and businesses. Optical fibers will certainly play an important role in carrying the vast amounts of voice and digital data on the Information Superhighway.

Optical fibers typically have an 8 to 100 μm central glass core surrounded by a glass cladding with a diameter of up to 250 μm. The cable is protected by a plastic outer shield. Unlike electric shielded cables, the optical fibers must not be kinked or wound about a radius less than the recommended minimum bending radius to avoid damage to the optical fiber cable or interfere with its performance.

When optical cables are installed in or terminated at a telecommunications or data transmission equipment, excess lengths of the optic cables may remain loose or unsecured. In telecommunication equipment that cross-connect many channels of voice and data signals, the large number of loose optical cables connected to the equipment may become an unmanageable, tangled mass. The mass of loose cables not only are unsightly but also may hinder equipment maintenance and servicing. The loose optic cables are also more prone to damage since they are unprotected and may be easily mishandled.

Accordingly, there is a need for apparatus for ordered arrangement and accommodation of excess lengths of a plurality of optic cables which ensures a minimum bending radius of the cables and protect the optic cables from mishandling.

SUMMARY OF THE INVENTION

In accordance with the present invention, an optical cable storage shelf and a method therefor are provided which eliminates or substantially reduces the disadvantages associated with prior optical cable storage apparatus and methods.

In one aspect of the invention, a storage shelf is provided for accommodating excess lengths of a plurality of optical cables connected to and extending from electronic equipment. The storage shelf includes a shelf housing with an open front and two substantially vertical side walls. The excess length of each optical cable is coiled about a spool formed in a cable storage cartridge. The storage cartridge can be slidably inserted in the shelf housing and stacked vertically therein. Each cable storage cartridge has two opposable members closeable about a hinge. The cable storage cartridge further has two cable exit ports for allowing the two ends of the optical cable to extend therethrough out of the cartridge for connection with the telecommunications equipment.

In another aspect of the invention, a method of storing excess lengths of a plurality of optical cables connected at two ends to electronic equipment is provided. The steps include coiling the excess length of each optical cable around a spool formed in a storage cartridge and permitting the two ends to exit out of the storage cartridge through the cable exit ports, snapping shut the storage cartridge, and inserting each storage cartridge into shelves formed in a storage shelf. The storage shelf can then be mounted onto the electronic equipment.

BRIEF DESCRIPTION OF THE DRAWINGS

For a better understanding of the present invention, reference may be made to the accompanying drawings, in which:

FIG. 3 is an isometric view of an open optical cable storage cartridge;

FIG. 4 is an isometric view of an open optical cable storage cartridge;

FIG. 5 is an isometric view of an open optical cable storage cartridge laid flat;

DETAILED DESCRIPTION OF THE INVENTION

The preferred embodiment of the present invention and its advantages are best understood by referring to FIGS. 1–7 of the drawings, like numerals being used for like and corresponding parts of the various drawings.

Figure 1:
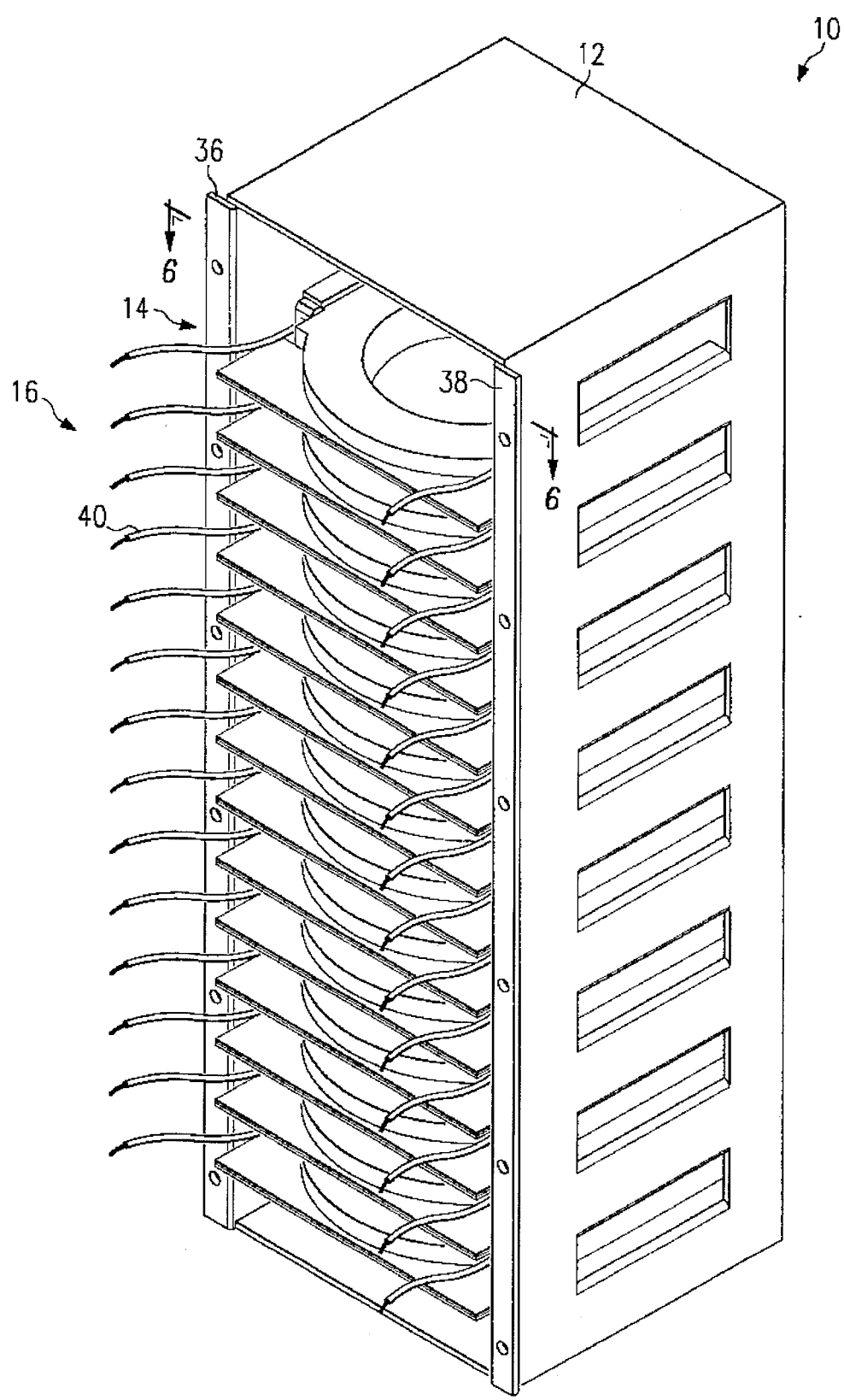
FIG. 1 is an isometric view of an embodiment of the fiber optic cable storage shelf.
Figure 2:
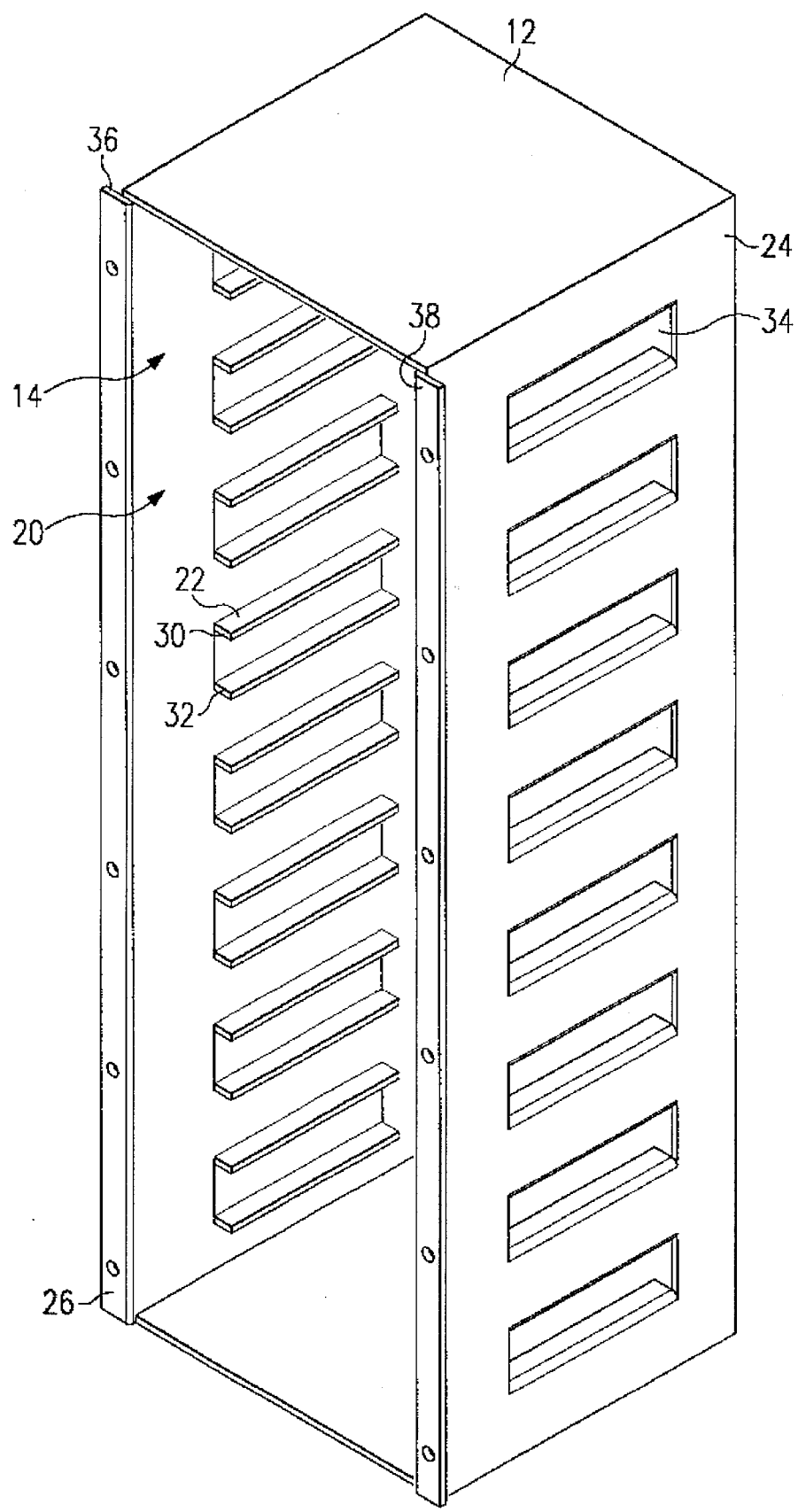
FIG. 2 is an isometric view of an embodiment of the fiber optic cable storage cartridge.

Referring to FIG. 1, a preferred embodiment of a fiber optic cable storage shelf 10 is shown. The fiber optic cable storage shelf 10 includes a generally rectangular shelf housing 12 having one open side 14 to permit the insertion of a plurality of optical cable storage cartridges 16 therein. The optical cable storage cartridges 16 may be stacked therein or preferably be accommodated by the vertically-arranged horizontal shelves 20 in the shelf housing 12, which are more clearly shown in FIG. 2. In the embodiment shown in FIG. 2, the horizontal shelves 20 are embodied in the lanced-in guides 22. Each cartridge guide 22 is constructed by making H-shaped cuts in the two side walls 24 and 26 of the shelf housing 12, where the height of the cuts are substantially equal to or somewhat longer than the thickness of a cartridge 16. The cut shelf wall material is pushed inward to form the upper and lower guides 30 and 32 for each cartridge 16. The result is the horizontal shelves or guides 22 for stacking and supporting the cartridges, and horizontal openings 34 in the side walls 24 and 26 of the shelf housing 12. The horizontal openings 34 provide the added benefit of enabling a clear side view of the contents of the storage shelf 10. It may be seen that ⌐¬-shaped cuts may be made in the walls 24 and 26 to form the lower guides only for each cartridge 16. Of course, conventional shelving arrangements with horizontal shelves are also contemplated by the teachings of this invention. Mounting flanges 36 and 38 may also be attached to the storage shelf 10 to provide means for mounting or attaching the storage shelf 10 to the equipment shelf (not shown). The location and dimensions of the mounting flanges 36 and 38 can be determined and modified according to the equipment shelving arrangement.

Referring to FIG. 3, an optical cable 40 is coiled in a compartment 41 disposed about a spool 42 formed in the optical cable storage cartridge 16. The spool 42 has a radius greater than or equal to the minimum bending radius of the optical cable 40. Therefore, when coiled around the spool 42, the optical cable coil has a controlled radius that will not result in cable damage. The ends of the optical cable 40 are routed through cable exit ports 44 and 46 for connection with equipment. Referring also to FIGS. 4 and 5, it may be seen that the cartridge 16 is composed of opposable lid 50 and base 52 connected by a hinge 56. Because a preferred embodiment of the cartridge 16 is the use of vacuum-formed transparent materials such as polyvinyl chloride, the hinge 56 is a living or self hinge which partition the base 52 and lid 50. Other plastic materials of similar properties that are transparent or opaque may also be used.

It may be seen from FIGS. 4 and 5 that the spool 42 may be formed by a circular indentation 58 in the lid 50 which is adapted to mate with a circular raised well 60 in the base 52. The compartment 41 that the coiled cable resides in is defined by depressions 61 formed in the base 52 and the lid 50. Disposed in the far corners of the cartridge from the hinge 56 are snaps or fasteners 62 and 64 for locking the lid 50 and base 52 shut. The snaps 62 and 64 may be formed by indentations 66 and 68 in the lid 50 and pegs 70 and 72 in the base 52 which are dimensioned to have a mating relationship with one another. When the lid 50 is folded over the base 52 at the hinge 56, the pegs 70 and 72 are aligned with the indentations 66 and 68 and press fit snugly therein.

Figure 6:
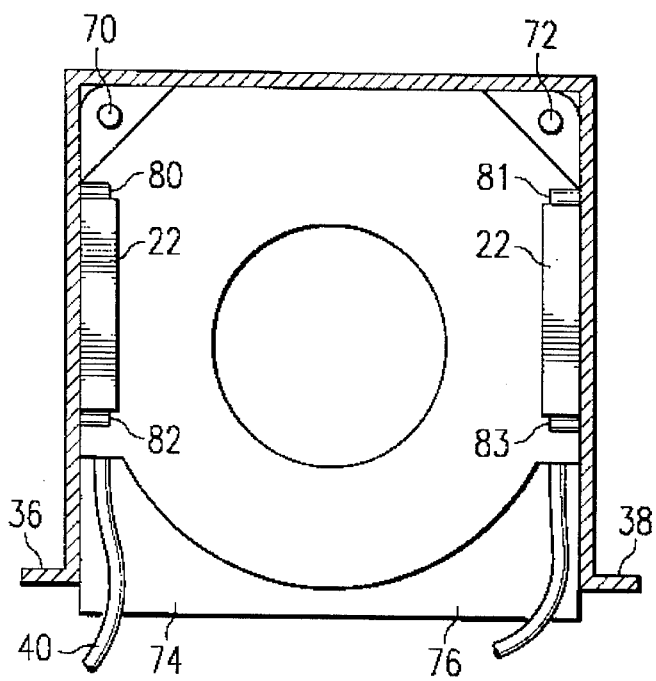
FIG. 6 is a cross-sectional top view of a cartridge inside the storage shelf taken along line 6—6 in FIG. 1.

The base 52 and the lid 50 are further formed to define pull tabs 74 and 76. The pull tabs 74 and 76 provide easy access and serve as handles for removing the cartridge 16 from the storage shelf 10. Four slightly protruding retention ridges 80–83 are also provided at the outer edges of the cartridge 16. As shown in FIG. 6, when the cartridge 16 is inserted into the shelf housing 10 along the guides 22, the guides 22 press down on the retention ridges 80 and 81. When the cartridge 16 is fully inserted, the retention ridges 80 and 81 pass the guides 22 and snap to full height beyond the guides 22. The retention ridges 80–83 therefore prevent any lateral movement of the cartridge 16 out of the storage shelf 10 when the storage shelf 10 is disturbed or tilted.

Figure 7:
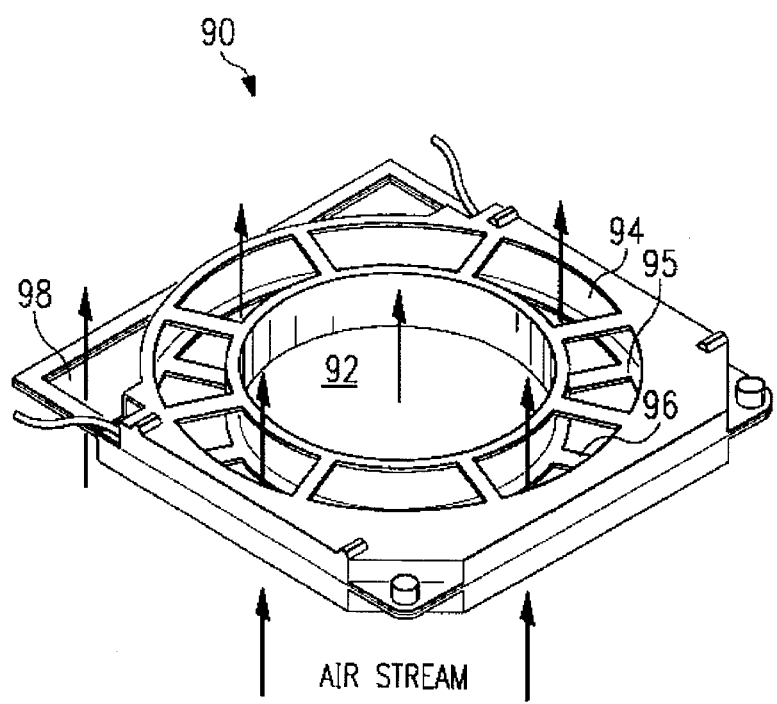
FIG. 7 is another embodiment of the fiber optic cable storage cartridge with ventilation openings.

Referring to FIG. 7, a cartridge 90 with ventilation openings 92–98 is shown to provide a passageway for cooling air flow generated to regulate the temperature of the electronic equipment. As shown, the spool 92 of the cartridge 90 may be open to allow air flow therethrough. Similarly, openings 94–96 in the base and lid forming the optical cable compartment may be formed to further admit air flow. Openings 98 may even be formed in the pull tabs. The ventilation openings 92–98 in the cartridge 90 may be accompanied by providing complementary ventilation openings (not shown) in the storage shelf 10.

In accordance with the teachings of the present invention, the excess lengths of optical cables hanging from electronic equipment are neatly organized, arranged and protected from mishandling. The advantages are even more significant where a large quantity of optical cables are involved. The optical cables are coiled in transparent vacuum-formed cartridges with controlled spool radius to prevent kinking or damage from mishandling to the cables. The cartridges are then arranged and stacked in a storage shelf that may be mounted on the back of the electronics equipment.

Although the present invention and its advantages have been described in detail, it should be understood that various changes, substitutions and alterations can be made therein without departing from the spirit and scope of the invention as defined by the appended claims.

What is claimed is:

1. A storage shelf for accommodating excess lengths of a plurality of optical cables extending from a telecommunications equipment, comprising:

a shelf housing having an open front side and two substantially vertical side walls;

a plurality of cable storage cartridges being slidably insertable in said shelf housing and being stackable vertically therein, each said cable storage cartridge including two opposable members closeable about a self hinge and forming a spool, one of said optical cable being coiled around said spool, said cable storage cartridge further defining two cable exit ports for allowing two ends of said cable extending therethrough out of said cable storage cartridge for connection with said telecommunications equipment; and at least one peg formed in one opposable member and at least one corresponding indentation formed in the other opposable member for locking said opposable members closed, said peg and indentation being sized for a tight mating relationship and being in alignment with one another when said opposable members are closed about said hinge.

2. The storage shelf, as set forth in claim 1, wherein said vertical side walls include a plurality of vertically aligned horizontal shelf guides.

3. The storage shelf, as set forth in claim 1, further comprising at least one mounting flange attached to said shelf housing for mounting onto said telecommunications equipment.

4. The storage shelf, as set forth in claim 1, wherein said cable storage cartridge spool has a radius of curvature greater than or equal to a predetermined minimum radius of curvature for said optical cable.

5. The storage shelf, as set forth in claim 1, wherein said cable storage cartridge further comprises an optical cable storage compartment defined in said opposable members and disposed about said spool.

6. The storage shelf, as set forth in claim 1, wherein said cable storage cartridge further comprises pull tabs.

7. The storage shelf, as set forth in claim 1, wherein said spool defines a ventilation port therethrough.

8. The storage shelf, as set forth in claim 1, wherein said cable storage cartridge further comprises ventilation air passage through said opposable members.

9. The storage shelf, as set forth in claim 1, wherein said cable storage cartridge further comprises a plurality of retention tabs for retaining said storage cartridge in said storage shelf.

10. The storage shelf, as set forth in claim 1, wherein said cable storage cartridge is constructed from vacuum-formed transparent plastic.

11. A storage shelf for accommodating excess lengths of a plurality of optical cables extending from a telecommunications equipment, comprising:

a shelf housing having an open front side and two substantially vertical side walls defining a plurality of vertically aligned horizontal shelf guides;

a mounting flange attached to said shelf housing for mounting onto said telecommunications equipment;

a plurality of cable storage cartridges being slidably insertable along said shelf guides into said shelf housing and stackable vertically therein, each said cable storage cartridges including two opposable members closeable about a self hinge and forming a spool, an optical cable being coiled about said spool, said cable storage cartridge defining two cable exit ports for allowing two ends of said cable extending therethrough out of said cable storage shelf for connection with said telecommunications equipment; and said cable storage cartridges further having at lest one ventilation air passage therethrough.

12. The storage shelf, as set forth in claim 11, wherein said cable storage cartridge spool has a radius of curvature greater than or equal to a predetermined minimum radius of curvature for said optical cable.

13. The storage shelf, as set forth in claim 11, wherein said cable storage cartridge further comprises fasteners for locking said opposable members closed.

14. The storage shelf, as set forth in claim 13, wherein each said fasteners comprises a peg formed in one opposable member and an indentation formed in the other opposable member, said peg and indentation being sized for a tight mating relationship and being in alignment with one another when said opposable members are closed about said hinge.

15. The storage shelf, as set forth in claim 11, wherein said cable storage cartridge further comprises an optical cable storage compartment defined in said opposable members and disposed about said spool.

16. The storage shelf, as set forth in claim 11, wherein said cable storage cartridge further comprises pull tabs.

17. The storage shelf, as set forth in claim 11, wherein said spool defines a ventilation port therethrough.

18. The storage shelf, as set forth in claim 11, wherein said cable storage cartridge further comprises a plurality of retention tabs for retaining said storage cartridge in said storage shelf.

19. The storage shelf, as set forth in claim 11, wherein said cable storage cartridge is constructed from vacuum-formed transparent plastic.

20. A method of storing excess lengths of a plurality of optical cables connected at two ends to electronic equipment, comprising the steps of:

coiling the excess length of each optical cable around a spool formed in a storage cartridge and pulling said two ends out of said storage cartridge through two cable exit ports;

snapping shut said storage cartridge;

inserting each said storage cartridge into shelves formed in a storage shelf;

mounting said storage shelf onto said electronic equipment; and providing ventilation through said storage cartridges for cooling said coiled optical cables by forming ventilation ports therethrough.

21. The method, as set forth in claim 20, further comprising the step of cutting side walls of said storage shelf and forming shelf guides therefrom for accommodating said storage cartridges.

22. The method, as set forth in claim 20, further comprising the step of vacuum-forming said storage cartridges out of plastic.

\* \* \* \* \*